(12) United States Patent
Wu et al.

(10) Patent No.: US 10,924,300 B2
(45) Date of Patent: *Feb. 16, 2021

(54) VIRTUAL CONTROLLER AREA NETWORK

(71) Applicant: Marvell Asia Pte, Ltd., Singapore (SG)

(72) Inventors: Fei Wu, Beijing (CN); Dehuan Meng, Beijing (CN); Biing Long Shu, Siglap (SG); Hugh Walsh, Los Gatos, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 142 days.

This patent is subject to a terminal disclaimer.

(21) Appl. No.: 16/160,619

(22) Filed: Oct. 15, 2018

(65) Prior Publication Data

US 2019/0052481 A1 Feb. 14, 2019

Related U.S. Application Data

(63) Continuation of application No. 15/233,136, filed on Aug. 10, 2016, now Pat. No. 10,103,901.

(60) Provisional application No. 62/206,022, filed on Aug. 17, 2015.

(51) Int. Cl.
*H04L 12/46* (2006.01)
*H04L 12/40* (2006.01)
*H04L 12/18* (2006.01)

(52) U.S. Cl.
CPC ...... *H04L 12/4641* (2013.01); *H04L 12/1881* (2013.01); *H04L 12/40013* (2013.01); *H04L 2012/40215* (2013.01); *H04L 2012/40273* (2013.01); *H04L 2212/00* (2013.01)

(58) Field of Classification Search
CPC ............ H04L 12/4641; H04L 12/1881; H04L 12/40013; H04L 2212/00; H04L 2012/40273; H04L 2012/40215
See application file for complete search history.

(56) References Cited

U.S. PATENT DOCUMENTS

| 2014/0023068 A1* | 1/2014 | Kim | ............... H04L 12/40006 370/355 |
| 2015/0214864 A1* | 7/2015 | Sopko | ............... B60W 10/08 318/3 |
| 2016/0378707 A1* | 12/2016 | Sikand | ............... B60L 58/10 713/189 |

* cited by examiner

*Primary Examiner* — Pao Sinkantarakorn
*Assistant Examiner* — Kabir U Jahangir

(57) ABSTRACT

According to an embodiment of the present disclosure, a virtual controller area network system includes first, second third controller area network (CAN) buses. A first CAN controller is coupled to the first and second CAN buses and is configured to route messages to and from the first and second CAN buses. A second CAN controller is coupled to the third CAN bus and is configured to route messages to and from the third CAN bus. A network bridging system is configured to route messages over a local area network between the first CAN controller and the second CAN controller.

20 Claims, 5 Drawing Sheets

VIRTUAL CONTROLLER AREA NETWORK

CROSS REFERENCE TO RELATED APPLICATIONS

This application is a continuation of U.S. patent application Ser. No. 15/233,136, filed Aug. 10, 2016 (now allowed), which in turn claims priority to U.S. Provisional Patent Application No. 62/206,022, filed Aug. 17, 2015. The aforementioned applications are incorporated herein by reference in their entireties.

FIELD

The technology described herein relates generally to controller area networks (CANs) and more particularly to systems and methods for providing a virtual CAN.

BACKGROUND

A controller area network (CAN) is a type of serial bus system that may be used for information exchange between electronic components in an automated environment, such as an automotive system, in real time and with a high level of security. A CAN is a conflict detection broadcast bus that is typically designed to operate at speeds of 1 Mbps or lower. Data is transmitted between CAN devices (referred to as nodes) in the form of messages (frames) that contain 0 to 8 bytes of data. Each message transmitted over the CAN includes a message identifier (message ID) that allocates a priority to the message and enables each CAN device on the network to determine if the message is relevant or if it should be filtered.

The description above is presented as a general overview of related art in this field and should not be construed as an admission that any of the information it contains constitutes prior art against the present patent application.

SUMMARY

The present disclosure is directed to systems and methods for providing a virtual controller area network (CAN). In an embodiment, a virtual controller area network system includes first, second third controller area network (CAN) buses. A first CAN controller is coupled to the first and second CAN buses and is configured to route messages to and from the first and second CAN buses. A second CAN controller is coupled to the third CAN bus and is configured to route messages to and from the third CAN bus. A network bridging system is configured to route messages over a local area network between the first CAN controller and the second CAN controller.

An example method for broadcasting messages in a virtual controller area network, according to an embodiment of the present disclosure includes associating a plurality of physical controller area network (CAN) buses to form a virtual CAN bus. The virtual CAN bus includes a first plurality of CAN buses coupled to a first CAN controller and a second plurality of CAN buses coupled to a second CAN controller. The method includes receiving, at the first CAN controller, a message broadcast from a node on one of the first plurality of CAN buses. The message is encapsulated into an Ethernet frame along with a CAN bus identifier that identifies at least one of the second plurality of CAN buses. The Ethernet frame is transmitted over a local area network from the first CAN controller to the second CAN controller using the CAN bus identifier. The message is extracted from the Ethernet frame. The extracted message is broadcast over at least one of the second plurality of CAN buses.

DETAILED DESCRIPTION

Modern automotive systems and applications require a controller area network (CAN) that can provide high performance with minimal complexity. The automotive Ethernet, as a long-term strategy, supports this trend. The Ethernet may be used as a backbone network to connect discrete CAN subsystems.

For example, a typical modern automobile may have as many as 100 electronic control units (ECUs) for various subsystems. Generally, an engine control unit is the largest processor. Other processors are typically used for subsystems such as a transmission system, an air bag system, an anti-lock braking systems (ABS), cruise-control, electronic power steering, an audio system, power windows, doors, mirror adjustment, a charging system for a hybrid/electric car, etc. Although some of these ECUs form an independent subsystem, communication with other ECUs is often necessary. For example, a subsystem may need to control an actuator or receive feedback from a sensor.

Figure 1:
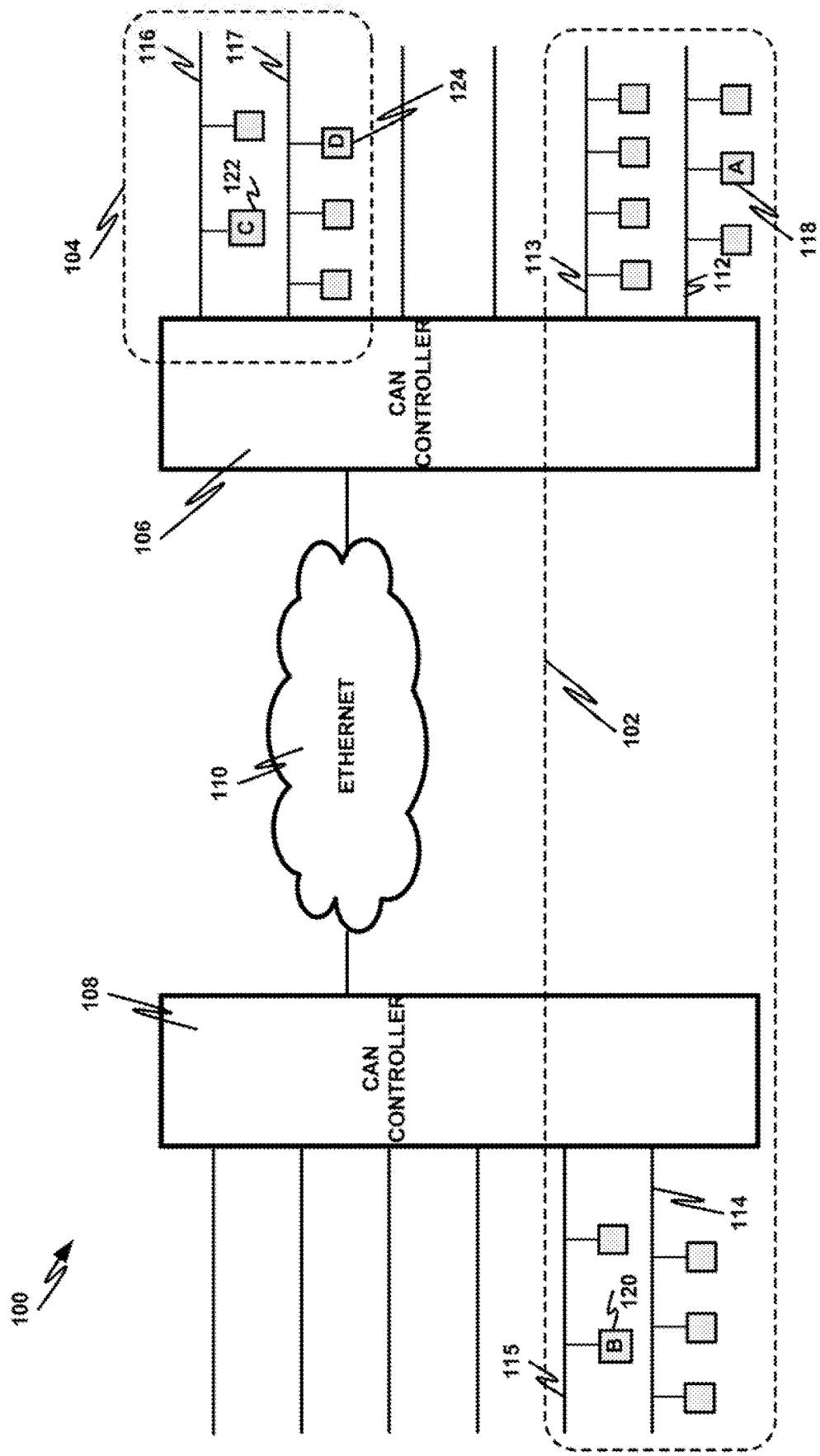
FIG. 1 depicts a diagram of an example CAN system that may be used to provide one or more virtual CAN bus according to an embodiment of the present disclosure.

FIG. 1 depicts a diagram of an example CAN system 100 that may be used to provide one or more virtual CAN bus according to an embodiment of the present disclosure. In the illustrated example, two virtual CAN buses 102, 104 are shown. A virtual CAN bus 102, 104 includes multiple different physical CAN buses in which the electronic control units (ECUs) operate as if they are all connected to a single physical CAN bus. The ECUs on a virtual CAN bus 102, 104 share a common message ID allocation scheme. Multiple CAN buses forming the virtual CAN bus 102, 104 may have different physical speeds (i.e., baud rates). The use of a virtual CAN bus 102, 104 may, therefore, break line length restrictions and bridge buses of different speeds.

The example illustrated in FIG. 1 includes two CAN controllers 106, 108 that are connected by an Ethernet backbone 110. Each CAN controller 106, 108 is connected to multiple physical CAN buses. In the illustrated example, one virtual CAN bus 102 is formed by the combination of four different physical CAN buses 112-115 that span across two CAN controllers 106, 108 coupled by the Ethernet backbone 110. Another virtual CAN bus 104 in the illustrated example is formed by the combination of two different physical CAN buses 116, 117 connected to the same CAN controller 106.

A virtual CAN bus 102, 104 is formed by defining a network topological structure in which each physical CAN bus (112-117) is assigned a CAN bus identifier (CAN bus ID). Physical CAN buses that are to be associated with the same virtual CAN bus are assigned the same CAN bus ID. The CAN bus ID may then be used by the CAN controllers 106, 108 and the Ethernet backbone 110 to route and broadcast messages on each of the physical CAN buses assigned to the virtual CAN bus. In this way, the combination of a standard CAN message ID and the CAN bus ID can be used to transmit messages between nodes on a virtual CAN bus 102, 104 as though all of the nodes were connected to the same physical CAN bus from the perspective of the node ECU.

As a first example, consider a message that is transmitted from node A (118) on physical CAN bus 112. Node A transmits the message along with a message ID that identifies an intended destination node B (120). Node B is on physical CAN bus 115. Physical CAN buses 112 and 115 are associated with the same virtual CAN bus 102 and thus share a common CAN bus ID that is associated with the virtual CAN bus. When the ECU in node A (118) broadcasts the message (with a message ID) onto the CAN bus 112, the source CAN controller 106 checks the message to determine, according to a preset filter with filtering, criteria, whether the CAN message is acceptable or should be terminated.

Some examples of filtering criteria that might indicate the message is not acceptable and prompt the source CAN controller 106 to terminate the received CAN message are the following: (1) the destination CAN node (destination node) does not have a message object (buffer) allocated in the controller; (2) the destination node's allocated message object is not enabled for reception; (3) the received message is not valid, for example the message does not conform to CAN protocol; (4) the direction (remote frame or data frame) configured in the destination node's message object does not match the direction in the received message; (5) the number of bits of the message ID of the received message is greater than, or differs from, the number of bits that the destination node is configured to accept, for example the destination node's message object is configured to accept only 11-bit message identifiers whereas the received message has a 29-bit identifier; (6) the received message has an error, and (7) the message ID in the received message is outside a range of acceptable values configured in the receiving destination node's message object.

If the CAN message is acceptable, then the message is encapsulated into an Ethernet frame along with a CAN bus ID. The CAN bus ID identifies the virtual bus that includes the physical bus that source node A is on. The Ethernet frame is transmitted over the Ethernet to the destination CAN controller 108. The destination CAN controller 108 decodes the Ethernet frame to extract the message and message ID and the CAN bus ID. The destination CAN controller 108 transmits the message and message ID onto every physical bus 114, 115 (that the controller 108 serves) that is associated with the virtual bus identified by the bus ID. The message ID is used by destination node B (120) to determine that the message is relevant and receive the message.

As a second example, consider a message and accompanying message ID that are transmitted from node C (122) on physical CAN bus 116 and are to be received by node D (124) on physical CAN bus 117. Physical CAN buses 116 and 117 are associated with the same virtual CAN bus 104 and thus share a common CAN bus ID. When the ECU in node C (122) broadcasts the message (with the message ID) onto the CAN bus 116, the CAN controller 106 checks the message to determine, according to a preset filter, whether the CAN message is acceptable or should be terminated. If the CAN message is acceptable, then the message, with the message ID, is broadcast onto the physical CAN buses 117 that are associated with the CAN bus ID. The message ID is then used by destination node D (124) to determine that the message is relevant and receive the message.

Accordingly, when a source node broadcasts a message along with a message ID, the controllers 106, 108 function together to transmit the message, with its message ID, onto all physical buses that are associated with the virtual bus that the source node is associated with. When controller 106 forwards an encapsulated message to controller 108, controller 106 uses the bus ID to identify the virtual bus that the source node's physical bus is associated with.

Figure 2:
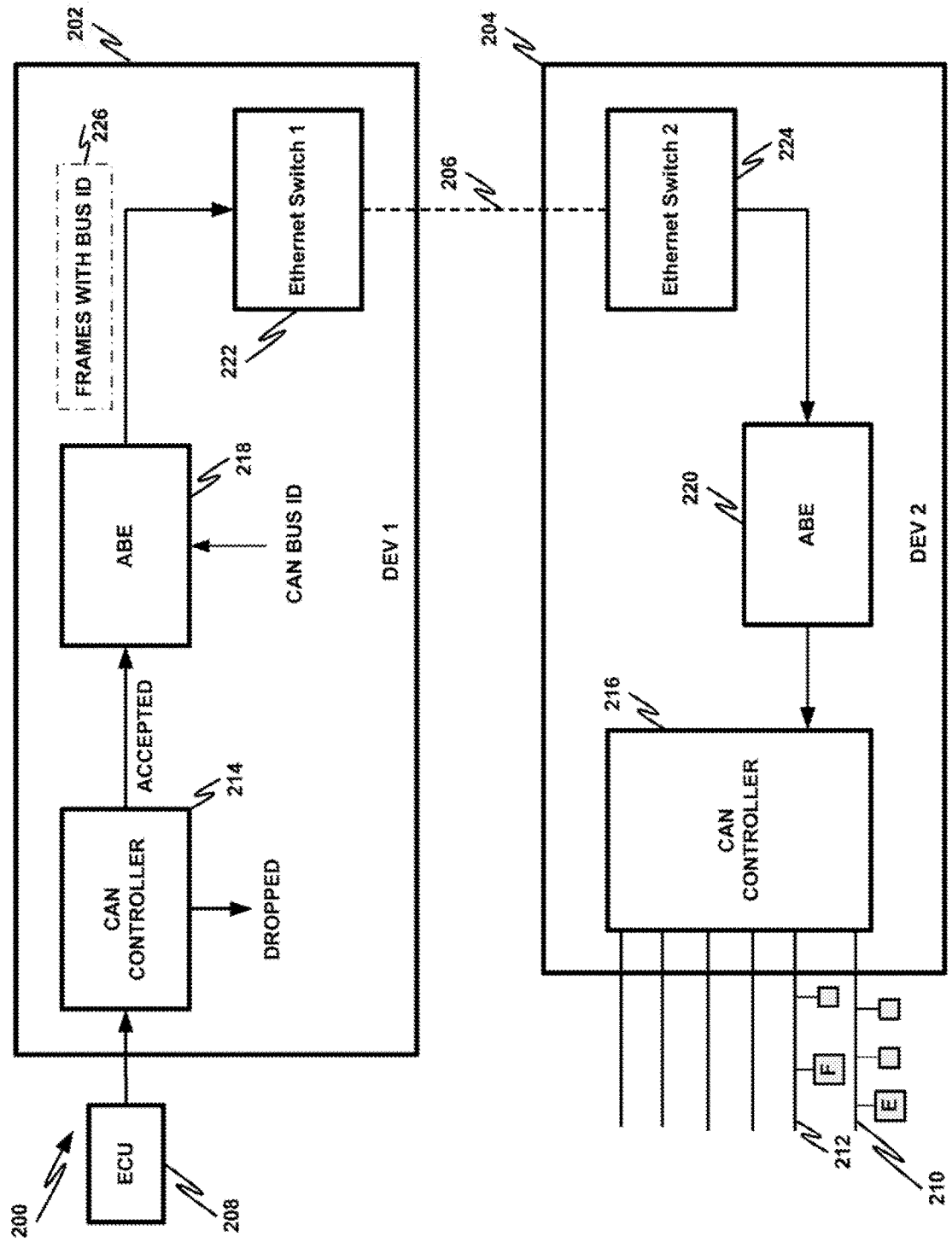
FIG. 2 is a block diagram depicting a more detailed example of message transmission over a virtual CAN bus according to an embodiment of the present disclosure.

FIG. 2 is a block diagram 200 depicting a more detailed example of message transmission over a virtual CAN bus according to an embodiment of the present disclosure. The illustrated example 200 includes two virtual CAN devices (Dev 1 and Dev 2) 202, 204 that are connected over an Ethernet backbone 206. In this example, the virtual CAN bus includes a node 208 on a physical CAN bus connected to Dev 1 202 and one or more physical CAN buses 210, 212 connected to Dev 2. Each virtual CAN device 202, 204 includes a CAN controller 214, 216 that is connected to the Ethernet 206 by an Automotive Bridge to Ethernet (ABE) block 218, 220 and an Ethernet switch 222, 224.

When an Ethernet switch on sending node 208 sends a CAN message, the source CAN controller 214 checks the CAN message to determine, according to a preset filter, whether the CAN message is acceptable or should be terminated. If the message is accepted, then the ABE 218 encapsulates (embeds) the CAN message into an Ethernet frame 226 along with the CAN bus ID. A CAN bus ID allocated to a physical CAN bus (210, 212) may, for example, be inserted into a can_bus_id field of an IEEE 1722 ACF message header, a stream_id field of an IEEE 1722 AVTPDU header, an Ethernet destination address, an Ethernet source address, or an Ethernet VLAN label. IEEE 1722 is an IEEE standard for audio video transport protocol (AVTP) that enables interoperable data streaming by defining media formats and encapsulations, media synchronization mechanisms and multicast address assignment. IEEE 1722 AVTPDU is a standard for AVTPDU data units (AVTPDUs), for enabling AVTPDUs to find each other. IEEE 1722 ACF is a standard for automatic control format (ACF).

The Ethernet frame 226, with the encapsulated CAN message and CAN bus ID and CAN message ID, is sent to the Ethernet switch 222. The Ethernet switch 222 transmits the Ethernet frame 226 through the Ethernet 206 (which may include one or more switch repeater sections). The frame 226 arrives at the destination device (Dev 2) 204.

At destination device 204, the destination device's Ethernet switch 224 routes the frame 226 from a port on which the frame was received to a port connected to the ABE 220. A Listener of the destination device's ABE 220 receives the Ethernet frame 226. The ABE Listener decodes the frame to extract the encapsulated CAN message from the frame 226. For each CAN message, the ABE Listener extracts a message ID that identifies the intended destination node and a CAN bus ID that identifies the virtual bus. The ABE Listener uses each of these IDs as an index to perform a lookup in a respective lookup table whose data entries are vectors specifying which CAN nodes may receive the CAN message. The entries of both index lookups are logically ANDed to provide a result. The result specifies on which CAN bus and which CAN node the message will be transmitted. Features of a scheme of decoding, extracting and table lookup are described in U.S. Provisional Application No. 62/261,583, filed Dec. 1, 2015, entitled "Routing Structure of Controller Area Network Control Message" and U.S. Provisional Application No. 62/261,611, filed Dec. 1, 2015, entitled "Switched Controller Area Network", both applications incorporated herein by reference.

The ABE Listener enqueues the extracted CAN message to message objects on associated nodes of the destination CAN controller 216. The ABE Listener enqueues the CAN message into a message object (buffer of the controller) associated with destination CAN node. The destination device's CAN controller 216 then transmits the CAN message on the identified CAN bus 210 or 212.

In another example, the CAN controller 116 receives a CAN message that is broadcast by a source (sending) node E that is on physical bus 210. The message includes a message ID that identifies a destination node that is on physical bus 212 that is served (serviced) by the same controller 216. The ABE determines that the source node's bus 210 is associated with a particular virtual bus that includes physical buses 210 and 212 and does not includes physical buses that are not serviced by controller 220. A Talker component of the ABE 220 extracts the received message. The ABE Talker encapsulates the received message and the message ID and the bus ID in an Ethernet frame. The ABE Talker transmits the Ethernet frame to a port on the Ethernet switch 224. The Ethernet switch 224 receives the Ethernet frame. Since the sending node E and destination node F are served by the same controller 216, the Ethernet switch 224 transmits the Ethernet frame back on the same port. The Ethernet 224 might optionally refrain from transmitting the frame over the Ethernet, since the controller 216 serves all of the physical buses of the identified virtual bus. A Listener component of the ABE 220 receives the Ethernet frame and extracts the CAN message and bus ID and message ID. The ABE Listener determines which CAN node to transmit the message on. The ABE Listener then enqueues the extracted CAN message to a corresponding message object node of the CAN controller. The CAN controller 216 then transmits the message on physical buses 210 and 212, for the message to be received by the recipient node F.

Figure 3:
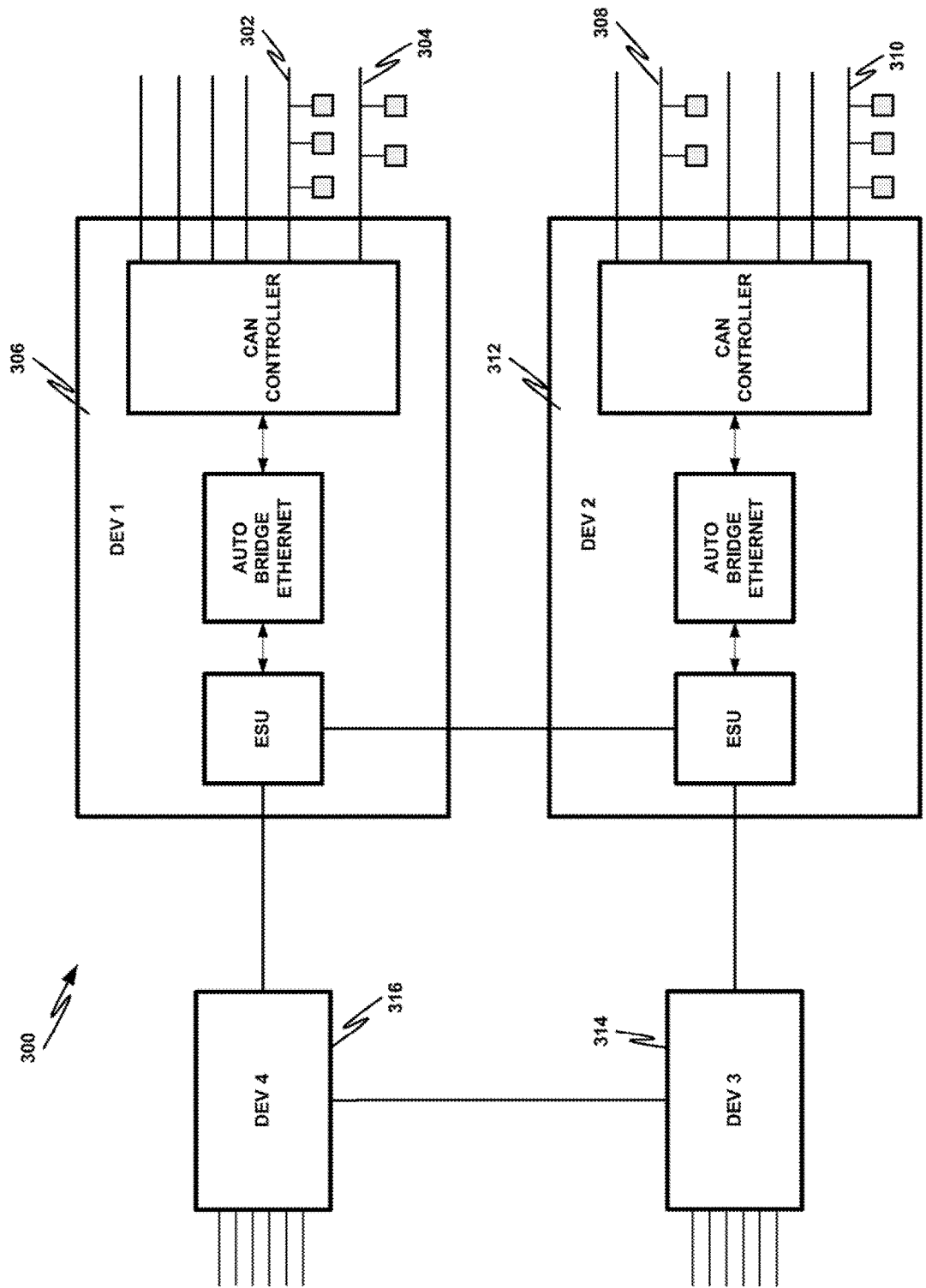
FIG. 3 is a block diagram depicting another example of a virtual CAN bus on an Ethernet backbone according to an embodiment of the present disclosure.

FIG. 3 is a block diagram depicting another example 300 of a virtual CAN bus on an Ethernet backbone according to an embodiment of the present disclosure. In this example 300, the virtual CAN bus is provided by associating physical CAN buses 302 and 304 on Dev 1 (306) and physical CAN buses 308, 310 on Dev 2 (312) with the same CAN subsystem, using the methods described above. The example shown in FIG. 3 illustrates that the Ethernet backbone may connect multiple virtual CAN devices 306, 312, 314, 316 in different network configurations. It should be understood that virtual CAN buses may be formed between physical CAN buses located on different systems (306, 312, 314, 316) throughout the network.

Figure 4:
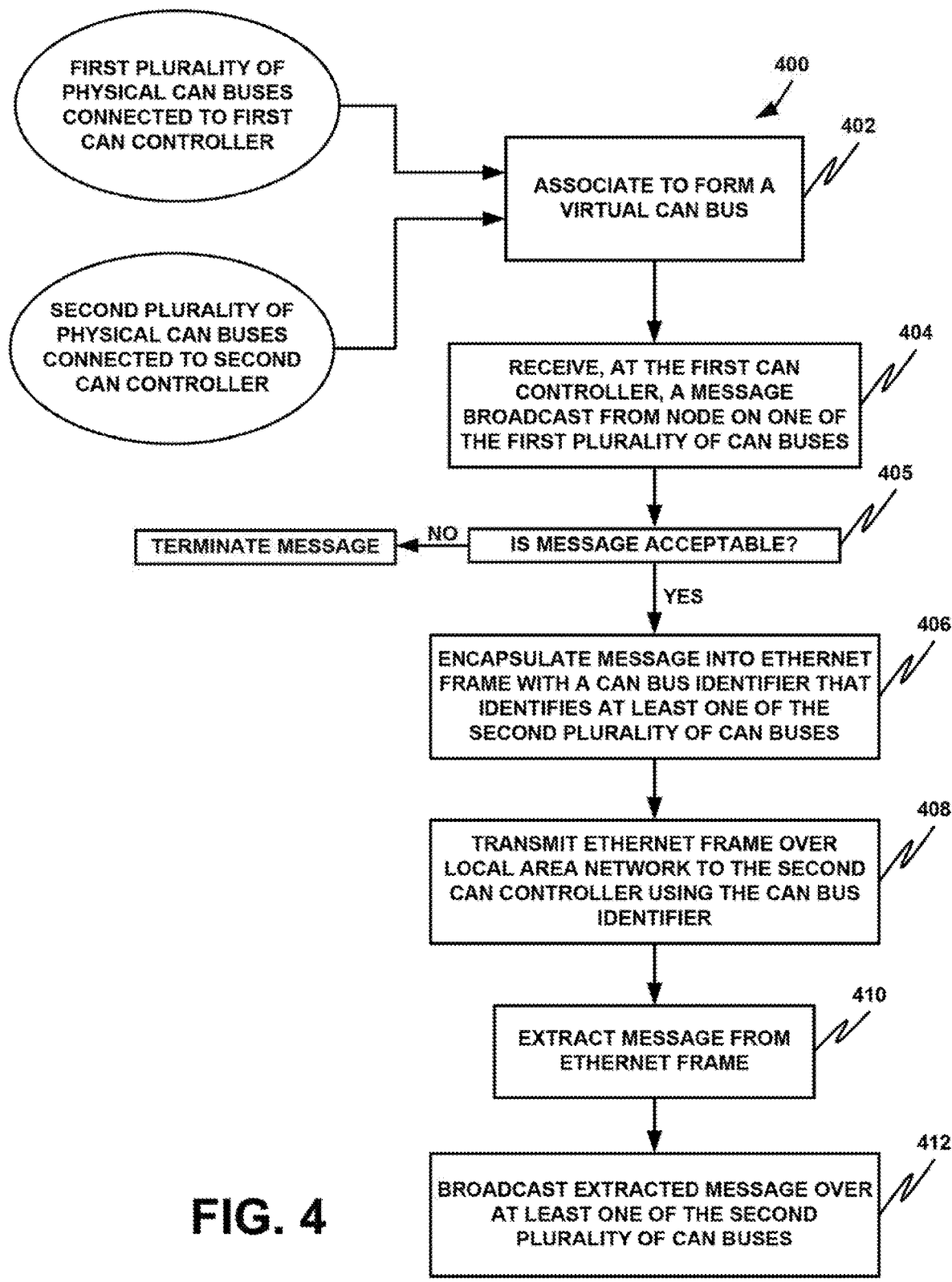
FIG. 4 is a flow diagram of an example method for broadcasting messages in a virtual CAN network according to an embodiment of the present disclosure.

FIG. 4 is a flow diagram of an example method 400 for broadcasting messages in a virtual CAN network according to an embodiment of the present disclosure. At 402, a plurality of physical CAN buses are associated to form a virtual CAN bus, where the virtual CAN bus includes at least first plurality of CAN buses coupled to a first CAN controller and a second plurality of CAN buses coupled to a second CAN controller. At 404, a message broadcast from a node on one of the first plurality of CAN buses is received by the first CAN controller. At 405, the controller determines whether the message is acceptable. If the message is not acceptable, then the message is terminated. If, however, the message is acceptable, then the method proceeds to 406. At 406, the message is encapsulated (embedded) into an Ethernet frame along with a CAN bus identifier (ID) that identifies at least one of the second plurality of CAN buses. At 408, the Ethernet frame is transmitted over a local area network to the second CAN controller using the CAN bus identifier. The message is extracted from the Ethernet frame at 410, and is broadcast over at least one of the second plurality of CAN buses at 412.

Figure 5:
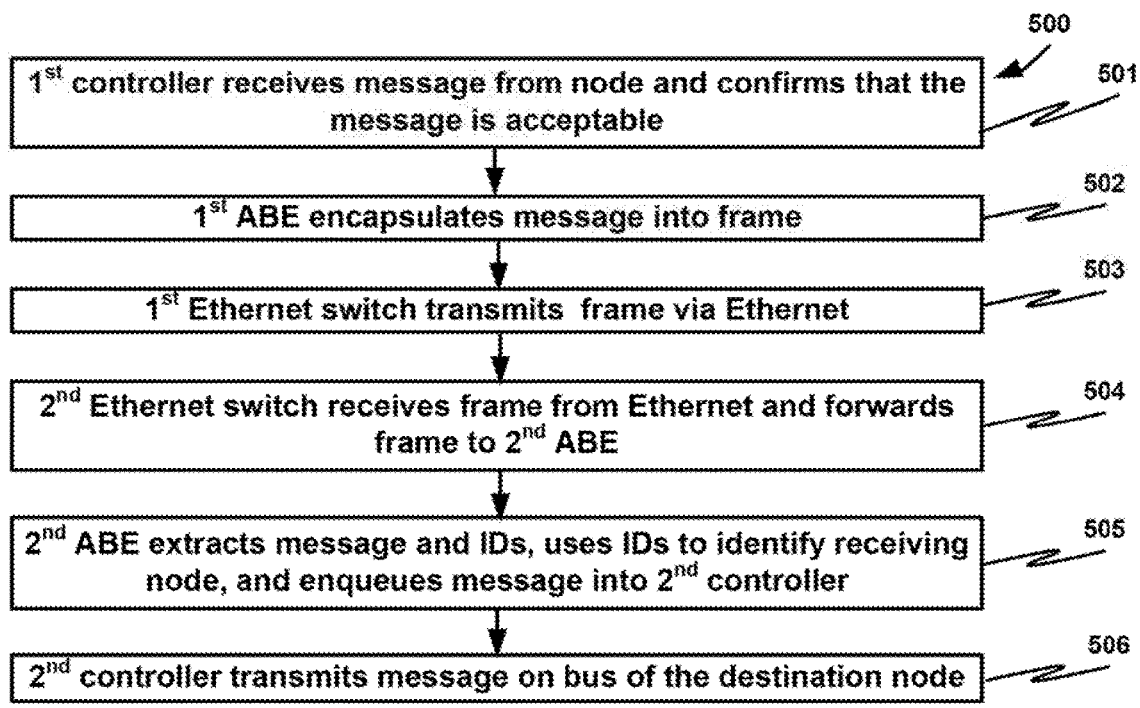
FIG. 5 is a flow diagram of another example method for broadcasting messages in a virtual CAN network according to an embodiment of the present disclosure.

FIG. 5 is a flow diagram of another example method 500 for broadcasting messages m a virtual CAN network according to an embodiment of the present disclosure. At 501, the first controller receives a message from a sending node and confirms that the message is acceptable. At 502, the first ABE encapsulates the message into an Ethernet frame. At 503, the first Ethernet switch transmits the frame through the Ethernet. At 504, the second Ethernet switch receives the frame from the Ethernet and forwards the frame to the second ABE. At 505, the second ABE extracts the message, along with the message ID and bus ID, from the frame, and enqueues the message and IDs into node objects of the second controller. In 506, the second controller transmits the message on the bus identified by the bus ID for receipt by the destination node.

Figure 6:
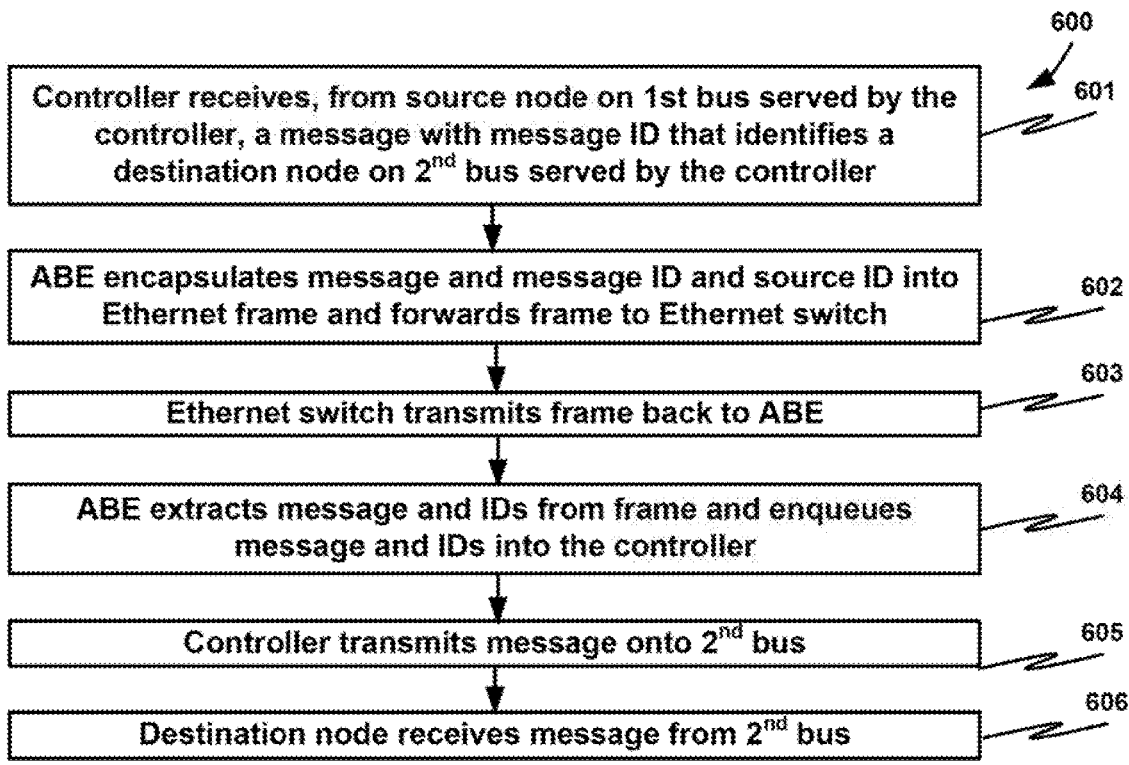
FIG. 6 is a flow diagram of yet another example method for broadcasting messages in a virtual CAN network according to an embodiment of the present disclosure.

FIG. 6 is a flow diagram of another example method 600 for broadcasting messages in a virtual CAN network according to an embodiment of the present disclosure. At 601, a controller receives a message from sending node that is on a first bus that is served (serviced) by the controller. The message includes a message ID that identifies an intended destination mode that is on a second bus that is, also, serviced by the controller. The controller forwards the message and message ID to the ABE. At 602, the ABE encapsulates message and the message ID and the bus ID into frame and forwards the frame to an Ethernet switch. At 603, the Ethernet switch transmits the frame back to the ABE (optionally instead of transmitting the frame over the Ethernet). At 604, the ABE extracts the message and the IDs from the frame. The ABE then enqueues the message and message ID into the controller. At 605, the controller transmits the message onto the first and second buses. At 606, the destination node receives the message from the second bus.

This application uses examples to illustrate the invention. The patentable scope of the invention may include other examples.

What is claimed is:

1. A virtual controller area network system, comprising:
   a plurality of electronic control units (ECU) nodes, wherein each of the plurality of ECU nodes employ a shared message identification format for use by the plurality of ECU nodes to identify messages transferred among ECUs that are disposed on a same controller area network (CAN);
   a plurality of physical CAN buses, wherein a respective CAN bus identifier is assigned to the plurality of physical CAN buses and wherein a first CAN bus identifier identifies two or more different physical CAN buses, among the plurality of physical CAN buses, that are designated as members of a same virtual CAN system;
   two or more CAN controllers respectively coupled to subsets of the plurality of physical CAN buses, wherein a first subset of physical CAN buses is coupled to first and second CAN controllers to define a first virtual CAN and a second subset of CAN buses is coupled to at least one of the CAN controllers to define a second virtual CAN that is different from the first virtual CAN; and an Ethernet backbone connecting at least to the two or more CAN controllers, the Ethernet backbone configured to generate an Ethernet frame containing: (i) a CAN message and (ii) a message ID for the CAN message, the Ethernet backbone being further configured to broadcast the Ethernet frame among ECU nodes coupled to the physical CAN buses in the first virtual CAN, without broadcasting the frame among ECU nodes coupled to different physical CAN buses in the second virtual CAN, based on the CAN bus identifier to identify the virtual CAN in which to broadcast the message.

2. The virtual controller area network system of claim 1, wherein the second CAN bus identifier is configured to identify two or more different physical CAN buses that are designated as members of the second virtual CAN that is different from the first virtual CAN.

3. The virtual controller area network system of claim 1, wherein the two or more CAN controllers are configured to determine whether a selected message is permissible to be transferred over the virtual CAN or should be terminated based on CAN filtering criteria.

4. The virtual controller area network system of claim 1, wherein different CAN buses coupled to the same virtual CAN operate at different speeds.

5. The virtual controller area network system of claim 1, wherein a destination ECU node in the virtual CAN is configured to extract the message ID from a broadcast frame and to determine that the destination ECU node based on the extracted message ID.

6. The virtual controller area network system of claim 1, comprising a network bridging system including a first Automotive Bridge to Ethernet (ABE) coupled to the first CAN controller and a second ABE coupled to the second CAN controller, wherein the first and second ABEs are configured to encapsulate the CAN bus identifier into an Ethernet frame for transmission over an Ethernet network.

7. The virtual controller area network system of claim 6, wherein the network bridging system further includes a first Ethernet switch coupled to the first ABE and a second Ethernet switch is coupled to the second ABE, wherein the first and second Ethernet switches are configured to transmit and receive Ethernet frames.

8. The virtual controller area network system of claim 1 wherein the first CAN controller is configured to determine whether received messages should be transmitted based on criteria that include (1) a destination node of a respective message does not have a message object allocated, (2) the destination node's allocated message object is not enabled for reception, (3) the received message is not valid, (4) a direction configured in the destination node's message object does not match the direction in the received message, (5) a number of bits of a message ID of the received message is greater than a number of bits that the destination mode is configured to accept, (6) the received message has an error, and (7) a message ID in the received message is outside a range of acceptable values configured in the receiving destination node's message object.

9. The virtual controller area network system of claim 6, wherein:

the plurality of physical CAN buses are associated with a virtual bus having a CAN bus identifier (ID);

the first CAN controller is configured to receive a CAN message that is sent by a sending node that is on the first CAN bus;

the first ABE is configured to:
extract the received message;
encapsulate the received message and the CAN bus ID in an Ethernet frame; and
transmit the Ethernet frame to a port on the first Ethernet switch;

the first Ethernet switch is configured to receive the Ethernet frame and transmit the Ethernet frame back to the first ABE; and the first ABE is further configured to:
receive the Ethernet frame;
extract the CAN message and the message ID; and
enqueue the extracted CAN message onto the first CAN controller; and the first CAN controller is configured to transmit the message on the second CAN bus.

10. The virtual controller area network system of claim 1, wherein the plurality of physical CAN buses are included within subsystems of an automotive system.

11. The virtual controller network system of claim 1, wherein the CAN bus identifier is inserted into one of a can_bus_id field of an IEEE 1722 ACF message header, a stream id field of IEEE 1722 AVTPDU header, an Ethernet destination address, or an Ethernet VLAN label.

12. A method for broadcasting messages in a virtual controller area network, comprising:

associating a plurality of physical controller area network (CAN) buses to form a virtual CAN bus, wherein the virtual CAN bus includes a first plurality of CAN buses coupled to a first CAN controller and a second plurality of CAN buses coupled to a second CAN controller, wherein a first CAN bus identifier identifies two or more different physical CAN buses, among the plurality of CAN buses, that are designated as members of a same virtual CAN system;

receiving, at the first CAN controller, a message broadcast from a node on one of the first plurality of CAN buses;

encapsulating the message into an Ethernet frame along with a CAN bus identifier that identifies at least one of the second plurality of CAN buses;

transmitting the Ethernet frame over a local area network from the first CAN controller to the second CAN controller using the CAN bus identifier;

extracting the message from the Ethernet frame; and broadcasting the extracted message over at least one of the second plurality of CAN buses.

13. The method of claim 12, wherein the local area network utilizes an Ethernet protocol.

14. The method of claim 12, further comprising:

receiving, by the first CAN controller, a CAN message that is sent by a sending node that is on a first CAN bus from among the first plurality, wherein the message includes a message ID that identifies a destination node that is on a second CAN bus, wherein the first and second CAN buses are different buses of the first plurality of CAN buses;

encapsulating, by a first Automotive Bridge to Ethernet (ABE), the received message and the message ID and bus ID in an Ethernet frame;

transmitting, by the ABE, the Ethernet frame to the first Ethernet switch;

transmitting, by the Ethernet switch, the Ethernet frame back to the ABE;

extracting, by the first ABE, the CAN message and the bus ID and the message ID from the frame;

enqueueing, by the first ABE, the extracted CAN message into the CAN controller; and transmitting, by the CAN controller, the message on the second CAN bus.

15. The method of claim 12, further comprising:

the first CAN controller determining, according to a preset filter, whether the message should be accepted or terminated.

16. The method of claim 15, further comprising:

the first CAN controller determining whether received message should be terminated based on criteria that match (1) a destination node of a respective message does not have a message object allocated, (2) the destination node's allocated message object is not enabled for reception, (3) the received message is not valid, (4) a direction configured in the destination node's message object does not match the direction in the received message, (5) a number of bits of a message ID of the received message is greater than a number of bits that the destination mode is configured to accept, (6) the received message has an error, and (7) a message ID in the received message is outside a range of acceptable values configured in the receiving destination node's message object.

17. The method of claim 12, wherein the CAN bus identifier is inserted into one of a can_bus_id field of an IEEE 1722 ACF message header, a stream_id field of IEEE 1722 AVTPDU header, an Ethernet destination address, or an Ethernet VLAN label.

18. The method of claim 12, wherein the second CAN bus identifier is configured to identify two or more different physical CAN buses that are designated as members of the second virtual CAN that is different from the first virtual CAN.

19. The method of claim 12, wherein the two or more CAN controllers are configured to determine whether a selected message is permissible to be transferred over the virtual CAN or should be terminated based on CAN filtering criteria.

20. The method of claim 12, wherein different CAN buses coupled to the same virtual CAN operate at different speeds.

* * * * *